US012470006B2

(12) United States Patent
Kobayashi et al.

(10) Patent No.: US 12,470,006 B2
(45) Date of Patent: Nov. 11, 2025

(54) CONNECTOR WITH A TERMINAL FITTING

(71) Applicant: Yazaki Corporation, Tokyo (JP)

(72) Inventors: Naoki Kobayashi, Makinohara (JP); Masaki Tanaka, Makinohara (JP)

(73) Assignee: Yazaki Corporation, Tokyo (JP)

( * ) Notice: Subject to any disclaimer, the term of this patent is extended or adjusted under 35 U.S.C. 154(b) by 300 days.

(21) Appl. No.: 18/470,853

(22) Filed: Sep. 20, 2023

(65) Prior Publication Data

US 2024/0128675 A1 Apr. 18, 2024

(30) Foreign Application Priority Data

Oct. 12, 2022 (JP) ................................ 2022-164072

(51) Int. Cl.
*H01R 13/428* (2006.01)
*H01R 13/05* (2006.01)

(52) U.S. Cl.
CPC ......... *H01R 13/428* (2013.01); *H01R 13/055* (2013.01); *H01R 2201/26* (2013.01)

(58) Field of Classification Search
CPC .......................... H01R 13/428; H01R 13/055; H01R 2201/26; H01R 4/185
USPC .......................................................... 439/852
See application file for complete search history.

(56) References Cited

U.S. PATENT DOCUMENTS 9,742,116 B1 * 8/2017 Nishiyama ........... H01R 13/641
2014/0235090 A1 8/2014 Omori et al.
2020/0321723 A1 * 10/2020 Takagi ................. H02G 15/013
2022/0069511 A1 * 3/2022 Masuda ............. H01R 13/5202

FOREIGN PATENT DOCUMENTS

JP 2013-073911 A 4/2013

* cited by examiner

*Primary Examiner* — Tulsidas C Patel
*Assistant Examiner* — Jeffrey Mountain
(74) *Attorney, Agent, or Firm* — Banner & Witcoff, Ltd.

(57) ABSTRACT

A connector includes a terminal fitting having a terminal portion in which a plurality of tab portions extends and a contact portion, a housing having a plurality of accommodating chambers in which the tab portions are accommodated, and a plurality of terminal-attached electric wires. The terminal fitting includes a first locking portion provided on the tab portions located from one end of the tab continuous portion to an intermediate position thereof, and a second locking portion provided on the tab portions located from the intermediate position to another end thereof. The first locking portion has a relatively large holding force for holding the tab portion in the accommodation chamber compared to the second locking portion. The counterpart terminal includes a tubular box portion and an opening provided on a side wall of the box portion and having a width through which the tab portion is able to pass.

4 Claims, 11 Drawing Sheets

CONNECTOR WITH A TERMINAL FITTING

CROSS-REFERENCE TO RELATED APPLICATIONS

This application is based on and claims priority under 35 USC 119 from Japanese Patent Application No. 2022-164072 filed on Oct. 12, 2022, the entire content of which is incorporated herein by reference.

TECHNICAL FIELD

The present invention relates to a connector including a terminal fitting provided with a plurality of tab portions, a housing accommodating the terminal fitting, and a plurality of terminal-attached electric wires electrically connected to the plurality of tab portions.

BACKGROUND ART

A terminal fitting provided with a plurality of tab portions electrically connected to counterpart terminals is proposed in the related art. Such a terminal fitting is generally manufactured by processing one single conductor plate, and is thus used as a joint terminal that connects a plurality of circuits or a ground terminal that connects a plurality of circuits to ground.

One of housing units in the related art is used as a ground terminal while accommodating such a terminal fitting in an accommodating chamber of a housing. Specifically, a part of the terminal fitting is electrically connected to a predetermined ground point (for example, a vehicle body frame of an automobile), and a plurality of circuits connected to counterpart terminals connected to a plurality of tab portions are collectively grounded (for example, see Patent Literature 1).

CITATION LIST

Patent Literature

Patent Literature 1: JP2013-073911A

SUMMARY OF INVENTION

When an automobile using a connector in the related art is disassembled, an operator or the like generally strongly pulls terminal-attached electric wires in a direction away from a housing in a state in which the connector is fixed to a vehicle body frame or the like. Accordingly, components (for example, so-called lances) for holding counterpart terminals in the housing are broken, and the terminal-attached electric wires are pulled out from the housing. When the terminal-attached electric wires are removed in this manner, a terminal fitting and the housing remain on the vehicle body frame or the like. From a viewpoint of achieving appropriate separation and disassembling, it is not desirable that a metal terminal fitting and a resin housing remain mixed in the vehicle body frame or the like. For this reason, the housing is preferably removed from the terminal fitting separately after the terminal-attached electric wires are removed as described above. However, the step of removing the housing may be a factor of impairing workability of the disassembling work.

An object of the present invention is to provide a connector that can be easily separated and disassembled.

To achieve the above object, the connector according to the present invention has the following features.

The connector includes a terminal fitting including a terminal portion and a contact portion, the terminal portion extending from a tab continuous portion such that a plurality of tab portions are arranged side by side in a predetermined direction at intervals, the contact portion being connected to the tab continuous portion and to an external terminal, the terminal portion and the contact portion being implemented by one single conductor plate; a housing having a plurality of accommodating chambers in which the plurality of tab portions are accommodated and in which the terminal fitting is accommodated; and a plurality of terminal-attached electric wires each including a counterpart terminal accommodated in the accommodating chambers and electrically connected to a corresponding one of the plurality of tab portions, and an electric wire to which the counterpart terminal is attached. The terminal fitting includes a first locking portion provided on each of at least one of the tab portions located from one end of the tab continuous portion in the predetermined direction to an intermediate position of the tab continuous portion, and a second locking portion provided on each of at least one of the tab portions located from the intermediate position to another end of the tab continuous portion in the predetermined direction. A holding force for holding the tab portions in the accommodating chambers by the first locking portion is larger than a holding force for holding the tab portions in the accommodating chambers by the second locking portion. The counterpart terminal includes a tubular box portion into which the tab portion is inserted, and an opening provided on a side wall of the box portion, the side wall being closer to the other end than to the one end, the opening having a width through which the tab portion is configured to pass in the predetermined direction.

According to the connector of the present invention, when an operator or the like pulls the terminal-attached electric wires in a direction away from the housing during disassembling work of an automobile or the like including the connector, an external force in the direction is applied to the housing via the counterpart terminals. At this time, since the holding force by the first locking portion on one end side of the tab continuous portion is larger than the holding force by the second locking portion on the other end side, the second locking portion having a relatively smaller holding force is easily separated from the housing before the first locking portion is. Further, the opening having a width through which the tab portion is configure to pass is provided on the side wall of the box portion of the counterpart terminal on the other end side. For this reason, the second locking portion of the tab portion is separated from the housing in a state in which the first locking portion of the tab portion is fixed to the housing, and the tab portion enters the opening of the counterpart terminal, whereby the entire housing is inclined. The tab portions are sequentially separated from the housing from the other end side toward the one end side of the tab continuous portion while the entire housing is inclined in this manner, and finally, all the tab portions are separated from the housing. By separating the plurality of tab portions sequentially, the terminal fitting and the housing can be separated with a smaller external force than that when the plurality of tab portions are separated from the housing at the same time. Accordingly, the terminal fitting and the housing can be separated before lances of the housing are broken as in a connector in the related art. As a result, the terminal fitting and the housing can be separated from each other simply by pulling the terminal-attached electric wires by an operator or the like as in the related art. Accordingly, the connector having the present configuration can be easily separated and disassembled.

The present invention is briefly described above. Details of the present invention are further clarified by reading modes for carrying out the invention described below with reference to the accompanying drawings.

DESCRIPTION OF EMBODIMENTS

Embodiments

Figure 1:
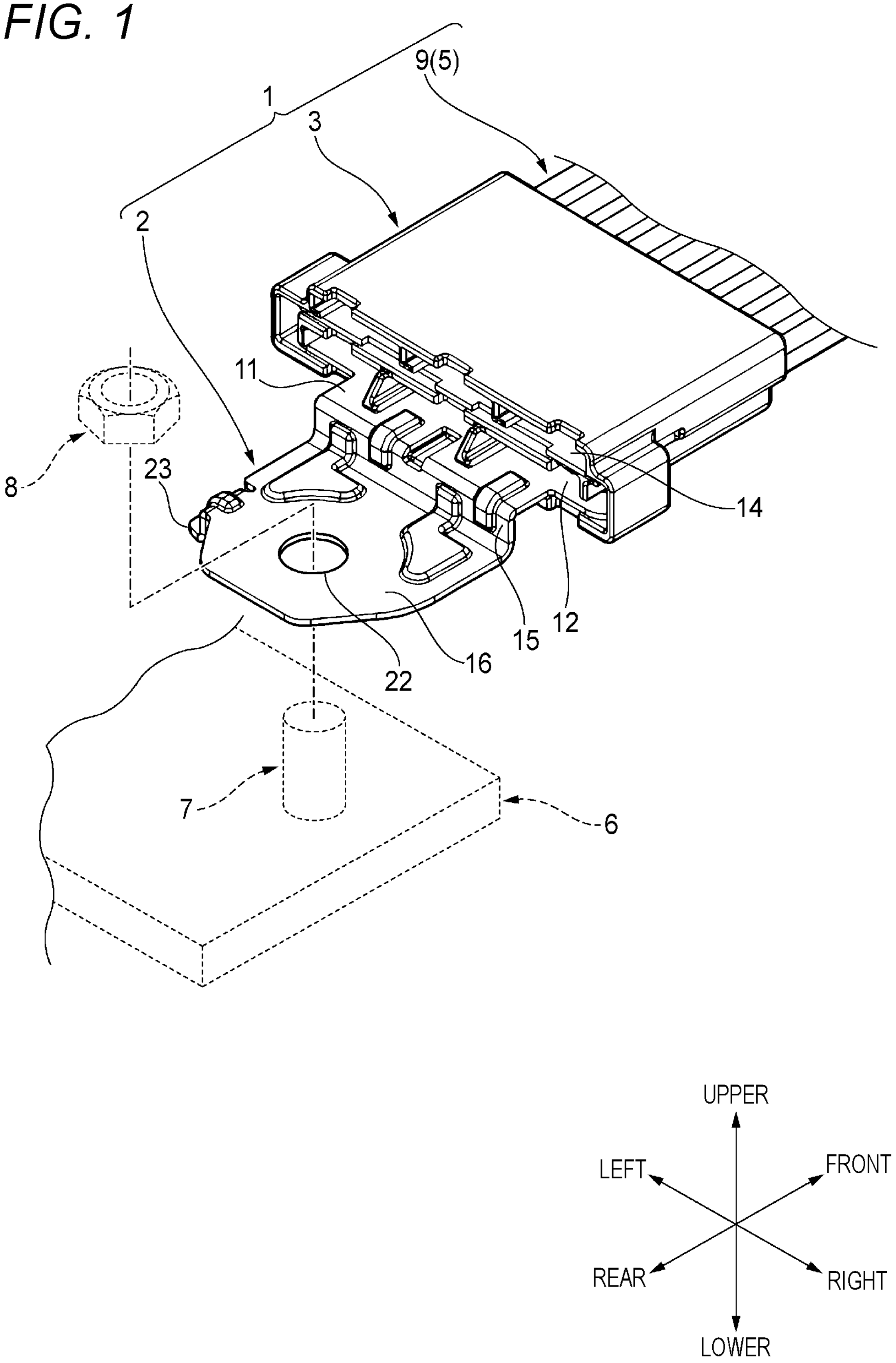
FIG. 1 is a perspective view showing a connector according to an embodiment of the present invention.

Hereinafter, a connector 1 according to an embodiment of the present invention will be described with reference to the drawings. Hereinafter, as shown in FIGS. 1 to 11, “front”, “rear”, “left”, “right”, “upper”, and “lower” are defined for convenience of description. A “front-rear direction”, a “left-right direction”, and an “upper-lower direction” are orthogonal to one another. The front-rear direction coincides with an attaching direction for attaching a terminal fitting 2 to a housing 3 (see FIG. 2) and an inserting direction for inserting counterpart terminals 4 connected to ends of electric wires 5 into the housing 3 (see FIG. 2).

Figure 2:
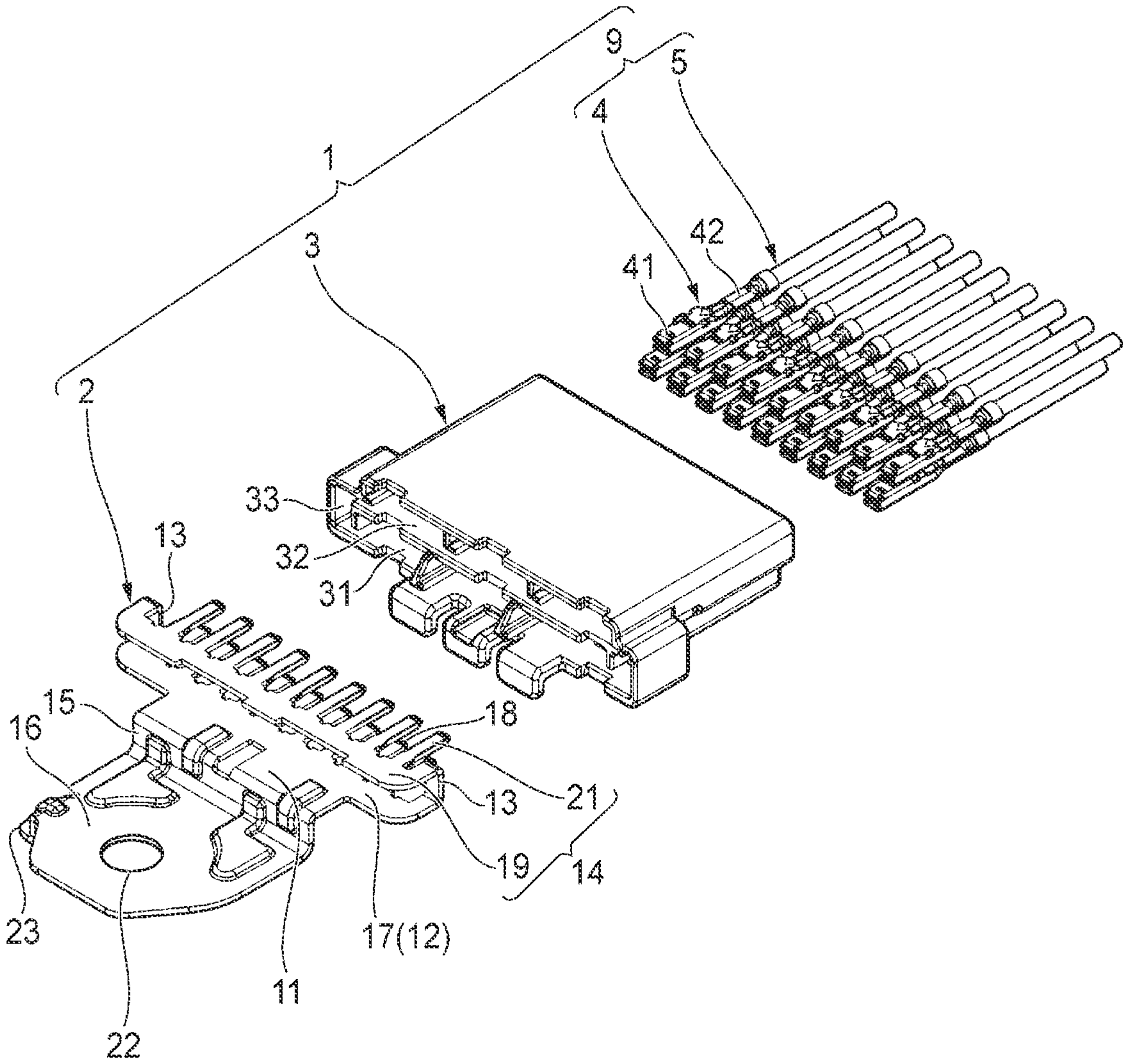
FIG. 2 is a perspective view showing a terminal fitting, a housing, and terminal-attached electric wires constituting the connector shown in FIG. 1.
Figure 2:
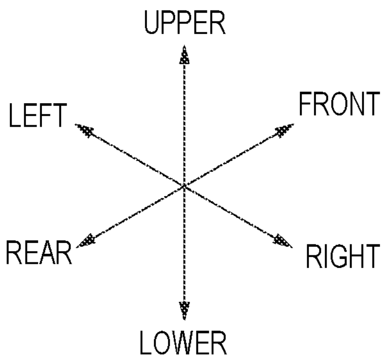

As shown in FIGS. 1 and 2, the connector 1 includes the terminal fitting 2, the housing 3 to which the terminal fitting 2 is attached from a rear side, and a plurality of terminal-attached electric wires 9 in which a plurality of counterpart terminals 4 are inserted into the housing 3 from a front side. When the terminal fitting 2 is electrically connected to a predetermined ground point 6 (see FIG. 1. For example, a vehicle body frame of an automobile), the connector 1 functions to collectively ground the plurality of electric wires 5 (that is, a plurality of circuits) connected to the plurality of counterpart terminals 4 conductively connected to the terminal fitting 2. The plurality of electric wires 5 constitute a part of a wire harness mounted on an automobile including the ground point 6. Hereinafter, members constituting the connector 1 will be described.

Figure 3:
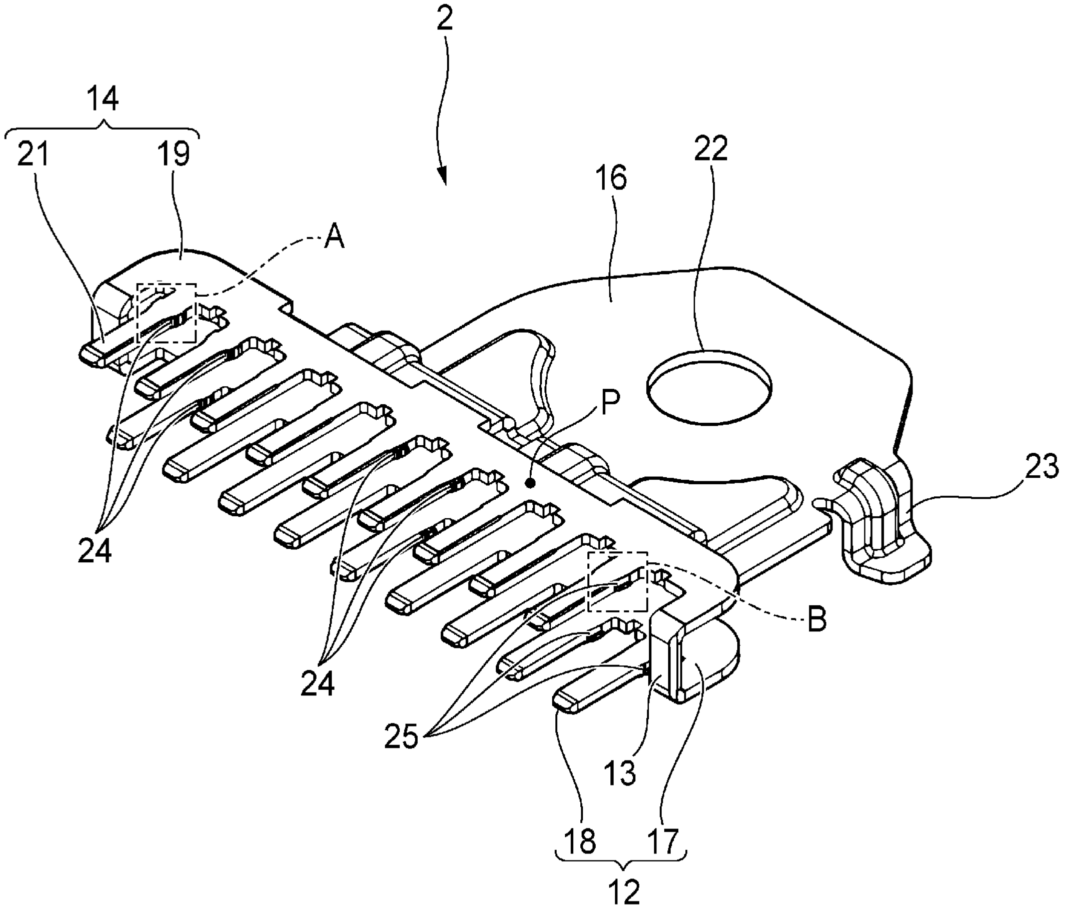
FIG. 3 is a front perspective view of the terminal fitting shown in FIG. 2.
Figure 3:
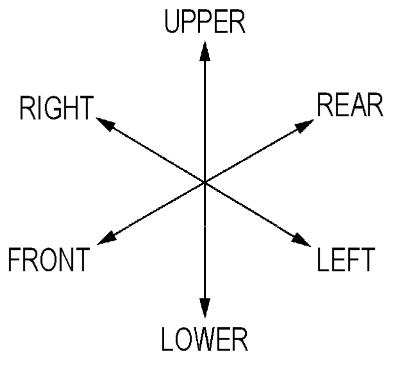

First, the terminal fitting 2 will be described. The terminal fitting 2 is formed by subjecting a conductor plate obtained by punching a flat conductor plate to predetermined bending. As shown in FIGS. 2 and 3, the terminal fitting 2 has a three-dimensional shape and integrally includes a main body portion 11 having a substantially rectangular flat plate shape elongated in the left-right direction, a first terminal portion 12 located on a front side of the main body portion 11 and extending in the left-right direction, a pair of left and right coupling portions 13 extending upward from two end portions of the first terminal portion 12 in the left-right direction, a second terminal portion 14 extending in the left-right direction to connect upper end portions of the pair of left and right coupling portions 13, a step portion 15 extending downward from a rear end edge of the main body portion 11 and having a substantially rectangular flat plate shape elongated in the left-right direction, and a fixing portion 16 having a flat plate shape extending rearward from a lower end edge of the step portion 15. The fixing portion 16 is formed with a through hole 22 penetrating the fixing portion in a plate thickness direction (upper-lower direction). The fixing portion 16 is further formed with a rotation preventing piece 23 on a peripheral edge portion (see FIGS. 1 to 3). Functions of the through hole 22 and the rotation preventing piece 23 will be described later.

The first terminal portion 12 and the second terminal portion 14 are three-dimensionally arranged to face each other with an interval in between in the upper-lower direction and extend in parallel to each other in the left-right direction by connecting left end portions of the first terminal portion 12 and the second terminal portion 14 by the left coupling portion 13 and connecting right end portions of the first terminal portion 12 and the second terminal portion 14 by the right coupling portion 13.

As shown in FIGS. 2 and 3, the first terminal portion 12 includes a first tab continuous portion 17 located on a front side of the main body portion 11 and having a substantially rectangular flat plate shape elongated in the left-right direction, and a plurality of first tab portions (male terminal portions) 18 extending forward at constant intervals in the left-right direction from a front end edge of the first tab continuous portion 17 that extends in the left-right direction. Similarly, the second terminal portion 14 includes a second tab continuous portion 19 located above the first tab continuous portion 17 and having a substantially rectangular flat plate shape elongated in the left-right direction, and a plurality of second tab portions (male terminal portions) 21 extending forward at constant intervals in the left-right direction from a front end edge of the second tab continuous portion 19 that extends in the left-right direction. The plurality of first tab portions 18 and the plurality of second tab portions 21 are arranged parallel to each other in the left-right direction at intervals in the upper-lower direction, and tip ends of the plurality of first tab portions 18 and tip ends of the plurality of second tab portions 21 are arranged in the same position in the front-rear direction. In the left-right direction, the first tab portions 18 are located between the second tab portions 21 adjacent to each other in the left-right direction, and the second tab portions 21 are located between the first tab portions 18 adjacent to each other in the left-right direction. Hereinafter, when it is not necessary to distinguish between the first tab portions 18 and the second tab portions 21, the first tab portions 18 and the second tab portions 21 are simply referred to as "tab portions 18, 21", and when it is not necessary to distinguish between the first tab continuous portion 17 and the second tab continuous portion 19, the first tab continuous portion 17 and the second tab continuous portion 19 are simply referred to as "tab continuous portions 17, 19". When it is not necessary to distinguish between a first accommodating chamber 31 and a second accommodating chamber 32, the first accommodating chamber 31 and the second accommodating chamber 32 are simply referred to as "accommodating chambers 31, 32".

As shown in FIG. 3, each of a plurality of (specifically, three) tab portions 18, 21 located near right ends of the tab continuous portions 17, 19 and each of a plurality of (specifically, three) tab portions 18, 21 located near the middle of the tab continuous portions 17, 19 in the left-right direction is provided with a first locking projection 24, and each of a plurality of (specifically, three) tab portions 18, 21 located near left ends of the tab continuous portions 17, 19 is provided with a second locking projection 25. In other words, when a freely selected position (for example, a position of a point P shown in FIG. 3) in the left-right direction between (i) the plurality of tab portions 18, 21 provided with the first locking projection 24 and located near the middle of the tab continuous portions 17, 19 in the left-right direction and (ii) the plurality of tab portions 18, 21 provided with the second locking projection 25 and located near the left ends of the tab continuous portions 17, 19 is referred to as an "intermediate position", the first locking projection 24 is provided on each of six tab portions 18, 21 located from the right ends of the tab continuous portions 17, 19 in the left-right direction to the intermediate position, and the second locking projection 25 is provided on each of three tab portions 18, 21 located from the intermediate position to the left ends of the tab continuous portions 17, 19 in the left-right direction. The number (=six) of the tab portions 18, 21 provided with the first locking projection 24 is larger than the number (=three) of the tab portions 18, 21 provided with the second locking projection 25. Among the tab portions 18, 21 provided in the terminal fitting 2, there are tab portions 18, 21 provided with neither the first locking projection 24 nor the second locking projection 25.

The first locking projection 24 and the second locking projection 25 function as press-fitting projections that slide while pressing partition walls 34 (see FIG. 8 and the like) to be described later of the accommodating chambers 31, 32 to be described later when the tab portions 18, 21 are press-fitted (inserted) into the accommodating chambers 31, 32 of the housing 3. In other words, the first locking projection 24 and the second locking projection 25 function to hold the tab portions 18, 21 accommodated in the accommodating chambers 31, 32 of the housing 3 in the accommodating chambers 31, 32.

Figure 4:
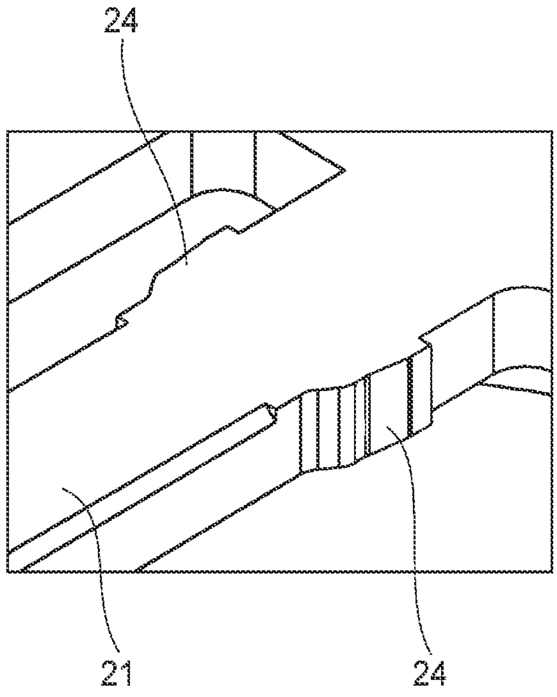
FIG. 4 is an enlarged view of a portion Ain FIG. 3.
Figure 4:
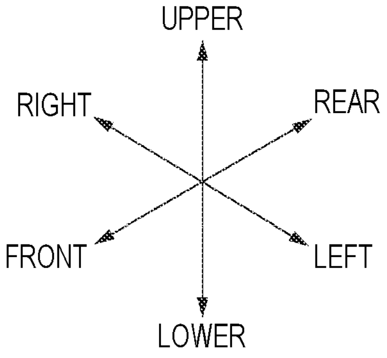
Figure 5:
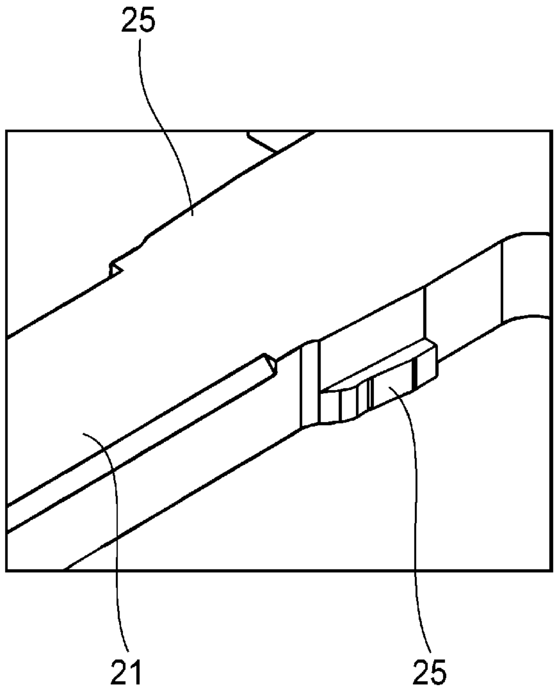
FIG. 5 is an enlarged view of a portion B in FIG. 3.
Figure 5:
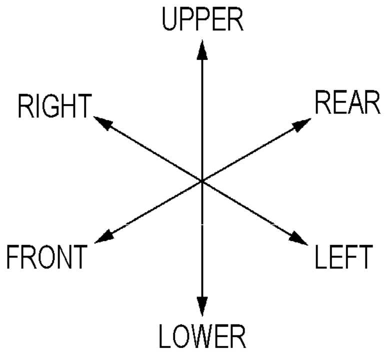

As shown in FIGS. 4 and 5, both the first locking projection 24 and the second locking projection 25 are a pair of left and right projections protruding outward in the left-right direction (in a plate surface direction of the conductor plate) from both side surfaces of the tab portions 18, 21 in the left-right direction and extending in the upper-lower direction (in the thickness direction of the conductor plate). As shown in FIG. 4, the first locking projection 24 has an upper-lower thickness equal to an upper-lower thickness (=a thickness of the conductor plate) of the tab portions 18, 21. On the other hand, as shown in FIG. 5, the second locking projection 25 has an upper-lower thickness smaller than the upper-lower thickness (=the thickness of the conductor plate) of the tab portions 18, 21. For this reason, a pressing contact area of the first locking projection 24 with the partition walls 34 of the accommodating chambers 31, 32 is larger than a pressing contact area of the second locking projection 25 with the partition walls 34 of the accommodating chambers 31, 32. Accordingly, a holding force for holding the tab portions 18, 21 in the accommodating chambers 31, 32 by the first locking projection 24 is larger than a holding force for holding the tab portions 18, 21 in the accommodating chambers 31, 32 by the second locking projection 25. An effect due to a difference between the holding force of the first locking projection 24 and the holding force of the second locking projection 25 will be described later.

Next, the housing 3 will be described. The housing 3 is a resin molded body and, as shown in FIG. 2, has a substantially rectangular tubular shape that is flat in the upper-lower direction and extends in the front-rear direction. In a hollow portion of the housing 3, the first accommodating chamber 31 for accommodating the first terminal portion 12 (the plurality of first tab portions 18) of the terminal fitting 2, the second accommodating chamber 32 for accommodating the second terminal portion 14 (the plurality of second tab portions 21) of the terminal fitting 2, and a pair of left and right coupling portion accommodating chambers 33 for accommodating the pair of left and right coupling portions 13 of the terminal fitting 2 are defined. The first accommodating chamber 31 and the second accommodating chamber 32 are partitioned in the left-right direction by the partition walls 34 (see FIG. 8) arranged side by side in the left-right direction corresponding to the plurality of tab portions 18, 21 of the terminal fitting 2 arranged side by side in the left-right direction.

Figure 6:
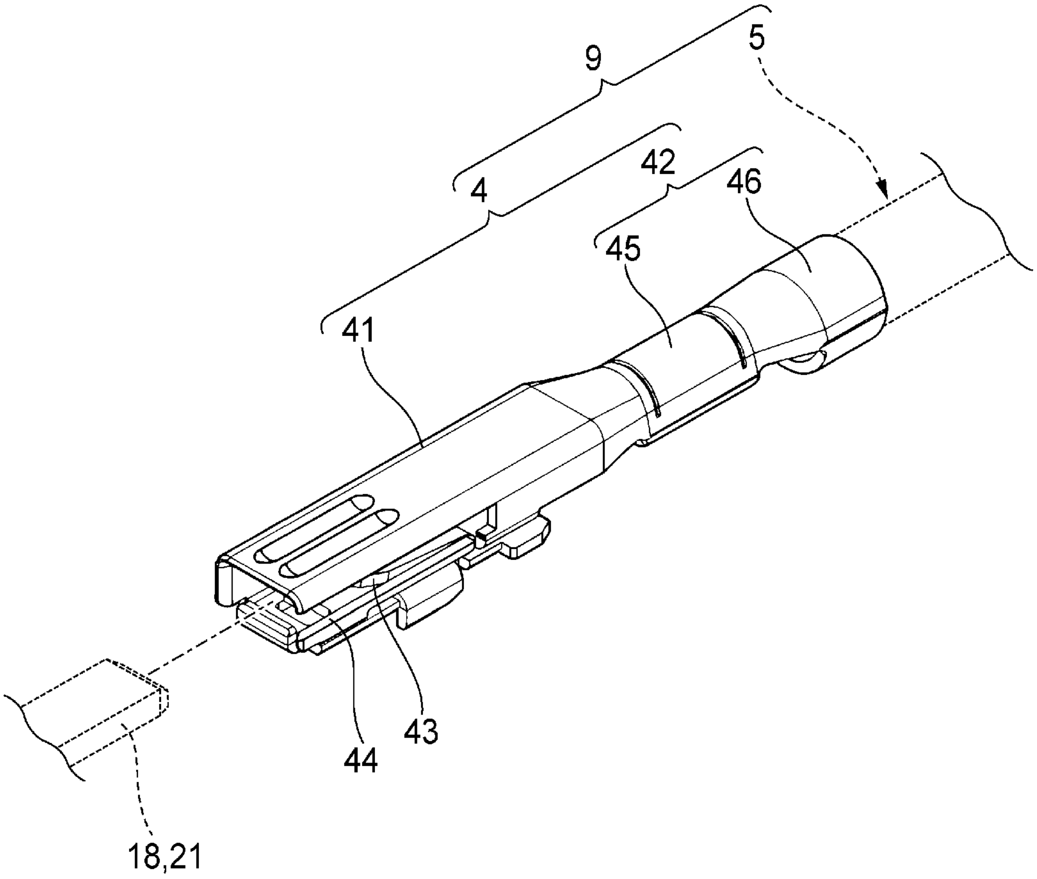
FIG. 6 is a lower perspective view of a counterpart terminal of the terminal-attached electric wire shown in FIG. 2.
Figure 6:
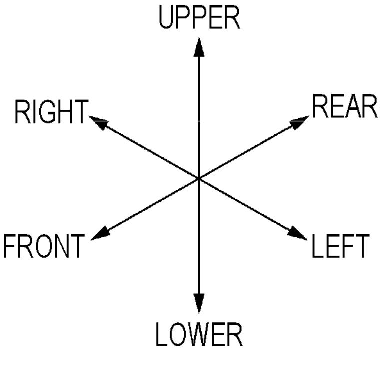
Figure 7:
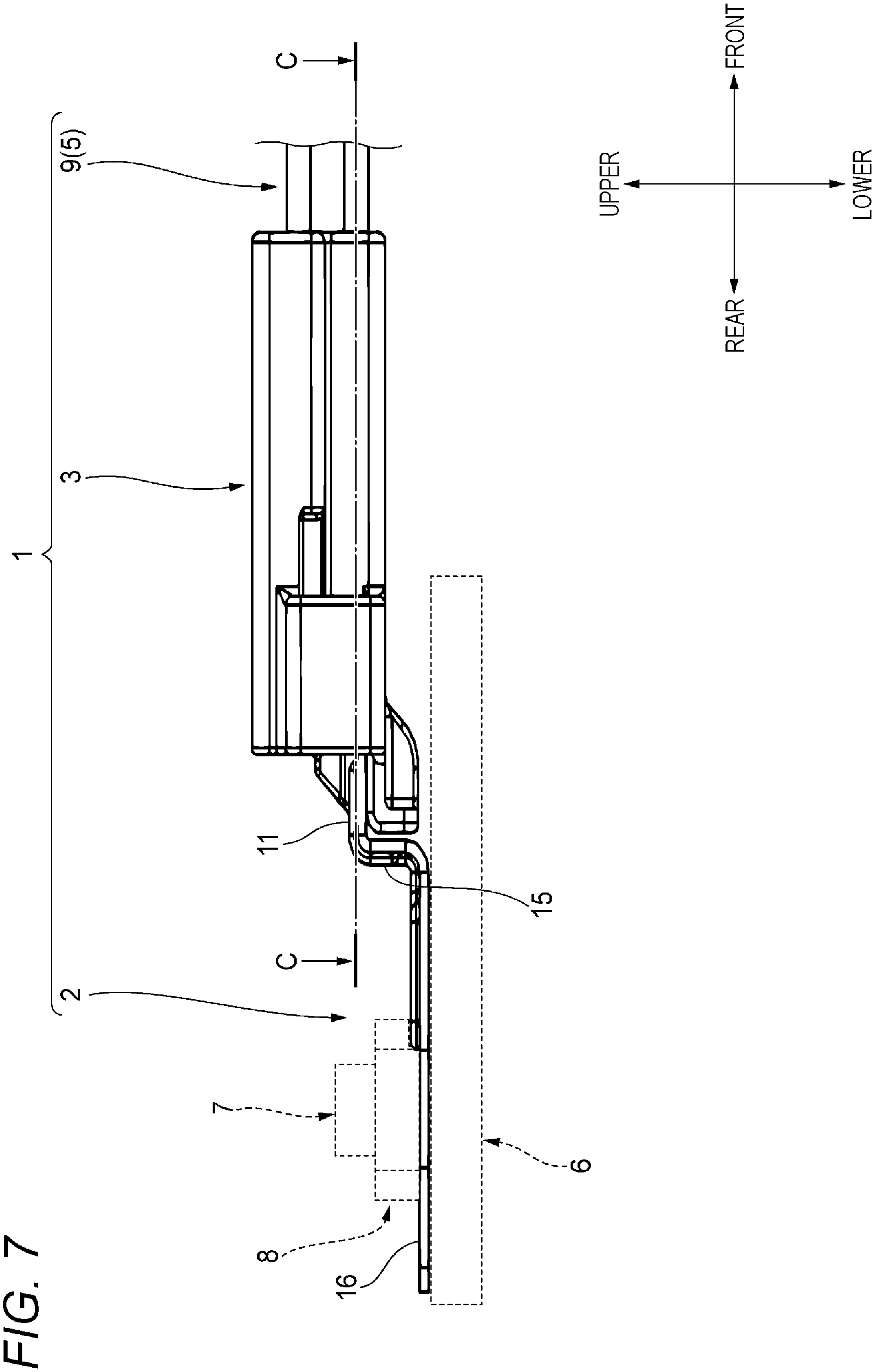
FIG. 7 is a side view of the connector shown in FIG. 1.
Figure 8:
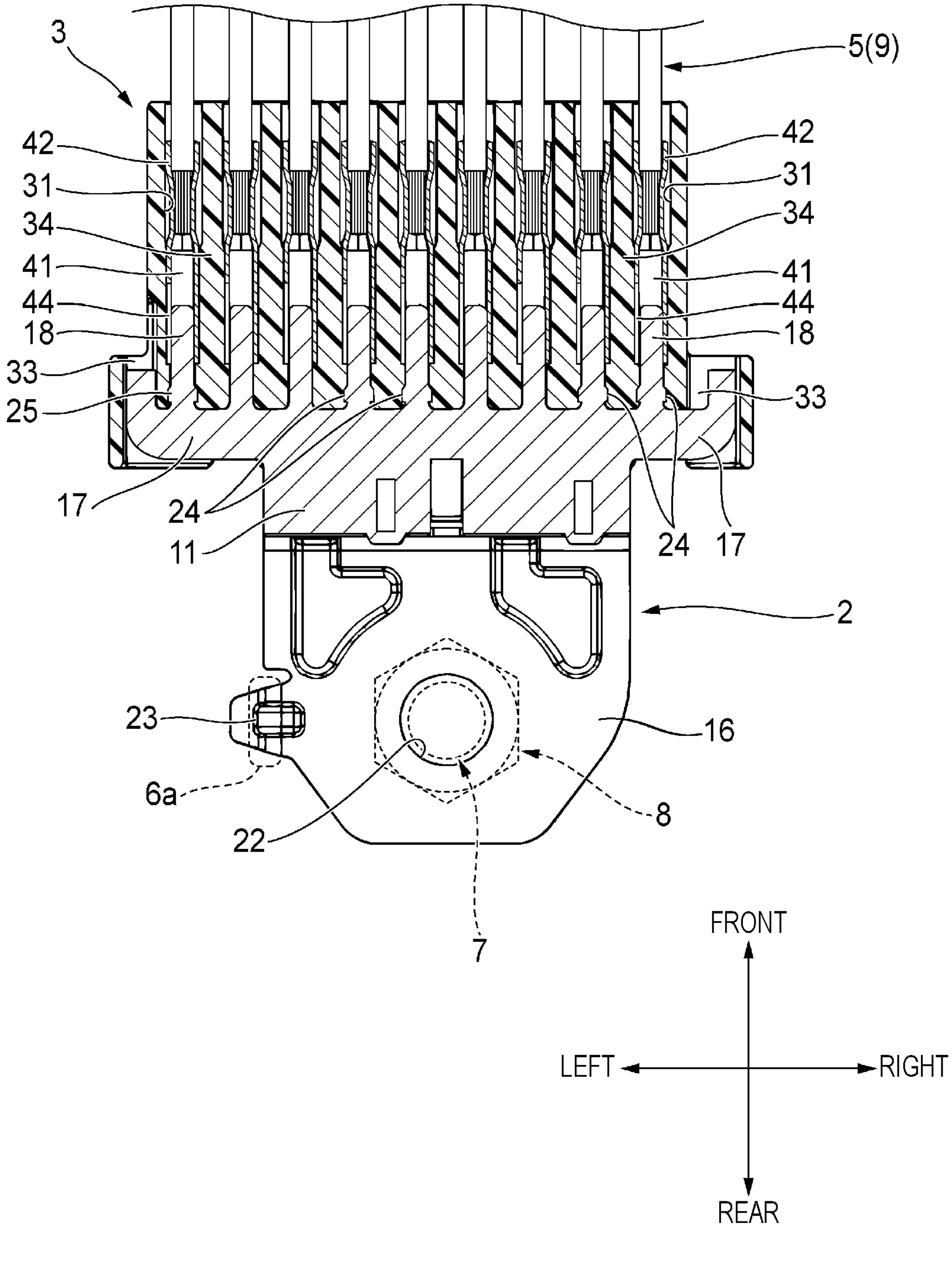
FIG. 8 is a cross-sectional view taken along a line C-C in FIG. 7.

Next, the terminal-attached electric wire 9 will be described. As shown in FIGS. 2 and 6, the terminal-attached electric wire 9 includes the counterpart terminal (female terminal) 4 and the electric wire 5 to an end of which the counterpart terminal 4 is attached. As shown in FIG. 6, the metal counterpart terminal 4 integrally includes a rectangular tubular box portion 41 extending in the front-rear direction and an electric wire connecting portion 42 connected to the end of the electric wire 5. The tab portion 18 or 21 (first tab portion 18 or second tab portion 21) of the terminal fitting 2 is inserted into the box portion 41. Inside the box portion 41, a spring-shaped contact 43 is provided. The box portion 41 is formed with, in a left side wall, an opening 44 that penetrates the box portion 41 in the left-right direction (plate thickness direction of the left side wall) and extends in the front-rear direction from a tip end position of the box portion 41. The opening 44 has a width through which the tab portion 18 or 21 inserted into the box portion 41 can pass in the left-right direction. An effect of the opening 44 will be described later.

As shown in FIG. 6, the electric wire connecting portion 42 includes a core wire crimping portion 45 located at the end of the electric wire 5 and crimping and fixing an exposed core wire, and a sheath crimping portion 46 crimping and fixing an end of an insulating sheath covering a periphery of the core wire of the electric wire 5. The members constituting the connector 1 are described above.

As shown in FIG. 2, the assembling of the connector 1 shown in FIG. 1 is completed by inserting the tab portions 18, 21 of the terminal fitting 2 into the housing 3 from the rear side and by inserting the counterpart terminals 4 of the plurality of terminal-attached electric wires 9 arranged side by side in the left-right direction in two upper and lower stages into the housing 3 from the front side. When the terminal fitting 2 is inserted into the housing 3, the tab portions 18, 21 provided with the first locking projection 24 or the second locking projection 25 are press-fitted into the accommodating chambers 31, 32 by the first locking projection 24 or the second locking projection 25 sliding while pressing the partition walls 34 (see FIG. 8 and the like) of the accommodating chambers 31, 32 of the housing 3, and are held in the accommodating chambers 31, 32 by the first locking projection 24 or the second locking projection 25 (see FIG. 8 and the like).

In an assembled state of the connector 1, the first terminal portion 12 (the plurality of first tab portions 18) of the terminal fitting 2 is accommodated in the first accommodating chamber 31 of the housing 3, the second terminal portion 14 (the plurality of second tab portions 21) of the terminal fitting 2 is accommodated in the second accommodating chambers 32 of the housing 3, and the pair of left and right coupling portions 13 of the terminal fitting 2 are accommodated in the pair of left and right coupling portion accommodating chambers 33 of the housing 3. The plurality of counterpart terminals 4 arranged side by side in the lower stage are respectively electrically connected to the plurality of first tab portions 18 by being accommodated in the first accommodating chamber 31 such that the spring-shaped contacts 43 of the respective box portions 41 are in elastic contact with the corresponding first tab portions 18. Each of the plurality of counterpart terminals 4 accommodated in the first accommodating chamber 31 is prevented from coming off forward from the first accommodating chamber 31 by engaging with a corresponding lance (not shown) provided in the first accommodating chamber 31. The plurality of counterpart terminals 4 arranged side by side in the upper stage are respectively electrically connected to the plurality of second tab portions 21 by being accommodated in the second accommodating chamber 32 such that the spring-shaped contacts 43 of the respective box portions 41 are in elastic contact with the corresponding second tab portions 21. Each of the plurality of counterpart terminals 4 accommodated in the second accommodating chamber 32 is prevented from coming off forward from the second accommodating chamber 32 by engaging with a corresponding lance (not shown) provided in the second accommodating chamber 32.

As shown in FIG. 1, the connector 1 after assembling is fixed to the predetermined ground point 6 (vehicle body frame or the like of an automobile) by fastening the fixing portion 16 of the terminal fitting 2 to the ground point 6. The fastening of the fixing portion 16 to the ground point 6 is performed, for example, by inserting a stud bolt 7 provided on the ground point 6 into the through hole 22 of the fixing portion 16 and fastening a nut 8 to the stud bolt 7 as shown in FIG. 1. At the time of fastening (fastening of the nut 8), the rotation preventing piece 23 provided on the fixing portion 16 engages with a locking hole 6*a* (see FIG. 8 and the like) provided in the ground point 6, thereby preventing the fixing portion 16 (that is, the terminal fitting 2) from rotating together. Accordingly, the plurality of electric wires 5 (that is, the plurality of circuits) connected to the plurality of counterpart terminals 4 electrically connected to the terminal fitting 2 are collectively grounded.

Operations and Effects

As described above, the connector 1 according to the present embodiment is used in a state of being fixed to the ground point 6 (vehicle body frame of an automobile or the like). When an automobile including the ground point 6 to which the connector 1 is fixed is disassembled, an operator or the like collectively pulls the electric wires 5 of the plurality of terminal-attached electric wires 9 away from (forward of) the housing as indicated by a white arrow in FIG. 9 in a state where the connector 1 is fixed to the ground point 6. As a result, an external force in that direction is applied to the housing 3 via the plurality of counterpart terminals 4. As described above, the holding force for holding the tab portions 18, 21 in the accommodating chambers 31, 32 by the first locking projection 24 is larger than the holding force for holding the tab portions 18, 21 in the accommodating chambers 31, 32 by the second locking projection 25. For this reason, the second locking projection 25 having a relatively smaller holding force is easily separated from the housing 3 earlier than the first locking projection 24. Further, the second locking projection 25 having a relatively smaller holding force is located on a relatively left side of the tab continuous portions 17, 19 relative to the first locking projection 24 (see also FIG. 3). For this reason, the tab portions 18, 21 on left end sides of the tab continuous portions 17, 19 are separated from the housing 3 first, whereby the entire housing 3 is slightly inclined (clockwise when viewed from above) so that a left side of the housing 3 moves in a direction away from (forward of) the terminal fitting 2 relative to the terminal fitting 2 fixed to the ground point 6.

Figure 9:
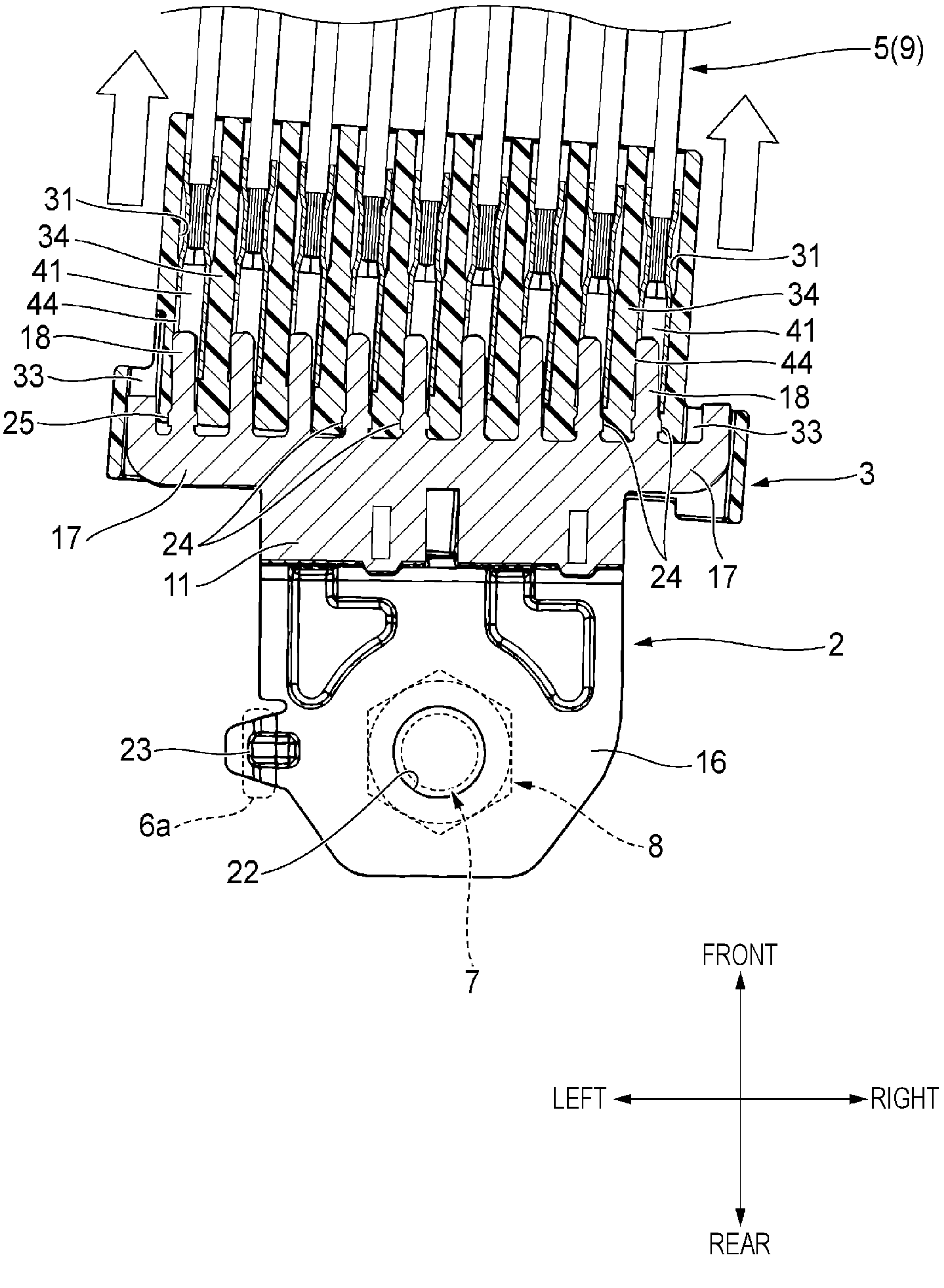
FIG. 9 corresponds to FIG. 8, showing a first stage (stage in which a tab portion of the terminal fitting enters an opening of the counterpart terminal due to inclination of the housing) of a process for separating the terminal fitting and the housing when electric wires of the terminal-attached electric wires are pulled in a direction away from the housing.

As shown in FIG. 9, when the entire housing 3 is slightly inclined, left corner portions of the tip ends of the tab portions 18, 21 enter the openings 44 provided in the left side walls of the box portions 41 of the counterpart terminals 4. Since the tab portions 18, 21 enter the openings 44 of the counterpart terminals 4, a progress of the inclination of the entire housing 3 is not hindered.

Figure 10:
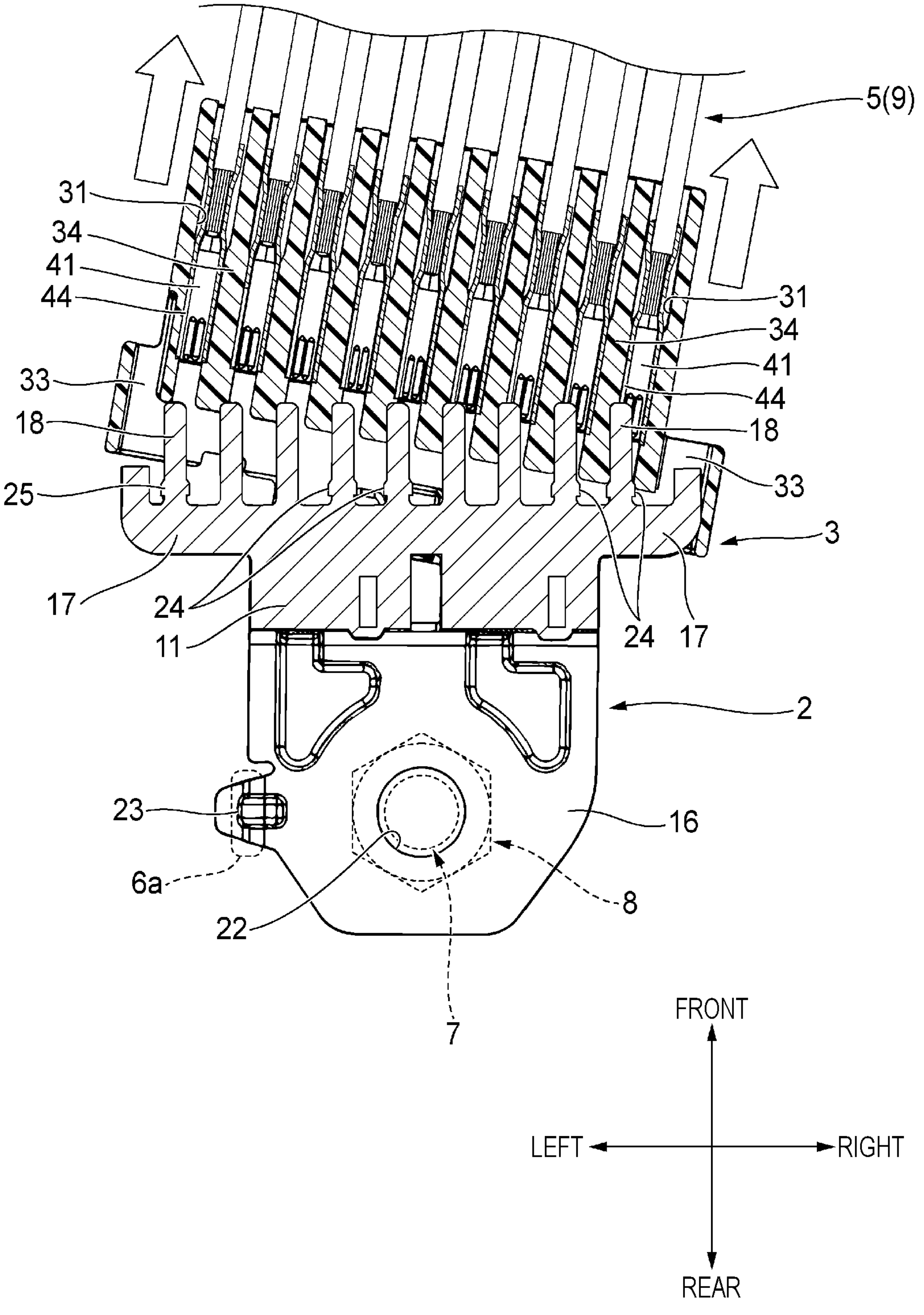
FIG. 10 corresponds to FIG. 8, showing a second stage (stage in which the tab portion of the terminal fitting presses and breaks a partition wall of an accommodating chamber due to the inclination of the housing) of the process for separating the terminal fitting and the housing when the electric wires of the terminal-attached electric wires are pulled in the direction away from the housing.

Next, as shown in FIG. 10, while the inclination of the entire housing 3 further progresses, the tab portions 18, 21 are separated from the housing 3 sequentially from the left end side to a right end side of the tab continuous portions 17, 19. At this time, the left corner portions of the tip ends of the metal tab portions 18, 21 pass through the openings 44 of the counterpart terminals 4 and at the same time press and break the left partition walls 34 of the accommodating chambers 31, 32 of the resin housing 3, and a further progress of the inclination of the housing 3 is hindered.

Figure 11:
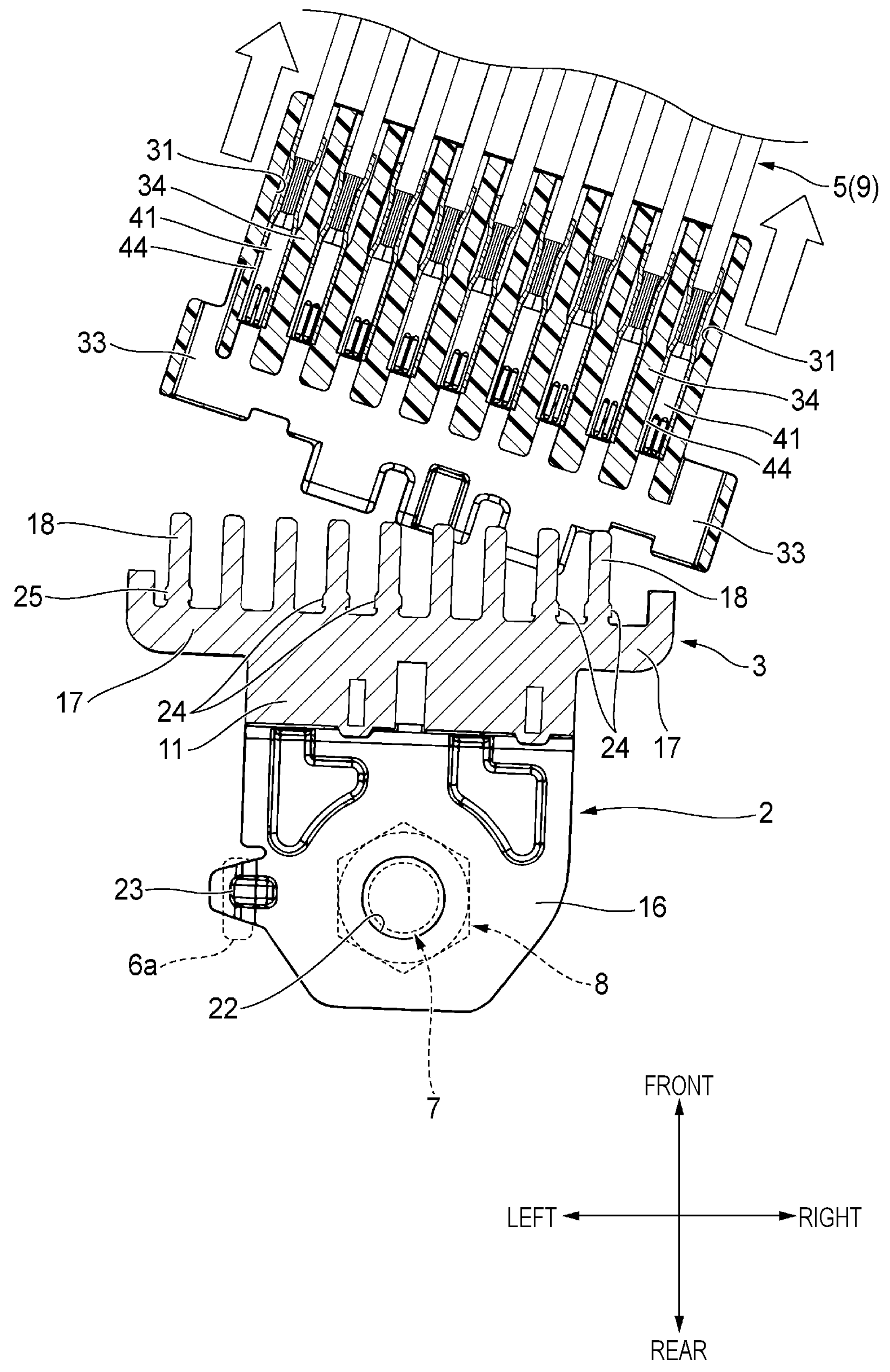
FIG. 11 corresponds to FIG. 8, showing a third stage (stage in which the housing is completely separated from the terminal fitting) of the process for separating the terminal fitting and the housing when the electric wires of the terminal-attached electric wires are pulled in the direction away from the housing.

Then, as shown in FIG. 11, all the tab portions 18, 21 are finally separated from the housing 3, and the housing 3 is completely separated from the terminal fitting 2.

Based on such a separation principle, the terminal fitting 2 and the housing 3 can be separated by a smaller external force than when the plurality of tab portions 18, 21 are collectively separated from the housing 3. Accordingly, the terminal fitting 2 and the housing 3 can be separated before lances of the housing are broken as in the related art. As a result, the terminal fitting 2 and the housing 3 can be separated by simply pulling the plurality of terminal-attached electric wires 9 collectively as in the related art by an operator or the like. Accordingly, the connector 1 according to the present embodiment can be easily separated and disassembled.

In the connector 1 according to the present embodiment, the number of the tab portions 18, 21 having the first locking projection 24 is larger than the number of the tab portions 18, 21 having the second locking projection 25. Due to such a difference in the number of the tab portions 18, 21, a holding force at a holding portion by the first locking projection 24 in the connector 1 can be made larger than a holding force at a holding portion by the second locking projection 25.

According to the connector 1 in the present embodiment, the terminal fitting 2 includes the tab portions 18, 21 that include neither the first locking projection 24 nor the second locking projection 25. This further facilitates the operation of separating the terminal fittings 2 while inclining the housing 3 as described above.

Other Embodiments

The present invention is not limited to the above-described embodiment and various modifications can be adopted within the scope of the present invention. For example, the present invention is not limited to the above-described embodiment, and modifications, improvements, and the like can be appropriately made. In addition, materials, shapes, sizes, numbers, arrangement positions, and the like of components in the above-described embodiment are freely selected and are not limited as long as the present invention can be implemented.

In the above embodiment, the first locking projection 24 is provided on each of the plurality of (three) tab portions 18, 21 located near the right ends of the tab continuous portions 17, 19 and on each of the plurality of (three) tab portions 18, 21 located near the middle of the tab continuous portions 17, 19 in the left-right direction, and the second locking projection 25 is provided on each of the plurality of (three) tab portions 18, 21 located near the left ends of the tab continuous portions 17, 19 (see FIG. 3 and the like). On the other hand, the first locking projection 24 may not be provided on each of the tab portions 18, 21 located near the middle of the tab continuous portions 17, 19 in the left-right direction, and the first locking projection 24 may be provided only on each of the tab portions 18, 21 located near the right ends of the tab continuous portions 17, 19.

In the above embodiment, the first locking projection 24 is provided on each of the six tab portions 18, 21 located from the right ends in the left-right direction to the intermediate position (for example, the position of the point P in FIG. 3) of the tab continuous portions 17, 19, and the second locking projection 25 is provided on each of the three tab portions 18, 21 located from the intermediate position to the left ends of the tab continuous portions 17, 19 in the left-right direction. On the other hand, the first locking projection 24 may be provided on one tab portion 18 or 21 located from the right end of the tab continuous portion 17 or 19 in the left-right direction to the intermediate position, and the second locking projection 25 may be provided on one tab portion 18 or 21 located from the intermediate position to the left end of the tab continuous portion 17 or 19 in the left-right direction.

In the above embodiment, the number of the tab portions 18, 21 including the first locking projection 24 is larger than the number of the tab portions 18, 21 including the second locking projection 25. On the other hand, the number of the tab portions 18, 21 including the first locking projection 24 may be smaller than the number of the tab portions 18, 21 including the second locking projection 25. In the above embodiment, the terminal fitting 2 includes the tab portions 18, 21 that include neither the first locking projection 24 nor the second locking projection 25. On the other hand, all of the plurality of tab portions 18, 21 of the terminal fitting 2 may include the first locking projection 24 or the second locking projection 25.

In the above embodiment, the second locking projection 25 having a relatively smaller holding force in the terminal fitting 2 is located on the relatively left side of the tab continuous portions 17, 19 relative to the first locking projection 24. Accordingly, when the electric wires 5 of the plurality of terminal-attached electric wires 9 are collectively pulled in the direction away from (forward of) the housing, the entire housing 3 is inclined clockwise as viewed from above so that the left side of the housing 3 moves in the direction away from (forward of) the terminal fitting 2 relative to the terminal fitting 2 (see FIGS. 9 to 11). On the other hand, for a reason of a layout or the like of an automobile on which the connector 1 is mounted, when the electric wires 5 of the plurality of terminal-attached electric wires 9 are collectively pulled in the direction away from (forward of) the housing and it is desirable that the entire housing 3 be inclined counterclockwise when viewed from above such that a right side of the housing 3 moves in the direction away from (forward of) the terminal fitting 2 relative to the terminal fitting 2, the second locking projection 25 having a relatively smaller holding force in the terminal fitting 2 may be located on a relatively right side of the tab continuous portions 17, 19 relative to the first locking projection 24.

Here, features of the embodiment of the connector 1 according to the present invention described above are briefly summarized and listed in the following [1] to [4].

[1] A connector (1) including:

a terminal fitting (2) including a terminal portion (12, 14) and a contact portion (16), the terminal portion (12, 14) extending from a tab continuous portion (17, 19) such that a plurality of tab portions (18, 21) are arranged side by side in a predetermined direction at intervals, the contact portion (16) being connected to the tab continuous portion (17, 19) and to an external terminal (6), the terminal portion (12, 14) and the contact portion (16) being implemented by one single conductor plate;

a housing (3) having a plurality of accommodating chambers (31, 32) in which the plurality of tab portions (18, 21) are accommodated and in which the terminal fitting (2) is accommodated; and a plurality of terminal-attached electric wires (9) each including a counterpart terminal (4) accommodated in a corresponding one of the accommodating chambers (31, 32) and electrically connected to a corresponding one of the plurality of tab portions (18, 21), and an electric wire (5) to which the counterpart terminal (4) is attached, wherein the terminal fitting (2) includes a first locking portion (24) provided on each of at least one of the tab portions (18, 21) located from one end in the predetermined direction to an intermediate position of the tab continuous portion (17, 19), and a second locking portion (25) provided on each of at least one of the tab portions (18, 21) located from the intermediate position to another end in the predetermined direction of the tab continuous portion (17, 19), a holding force for holding the tab portions (18, 21) in the accommodating chambers (31, 32) by the first locking portion (24) is larger than a holding force for holding the tab portions (18, 21) in the accommodating chambers (31, 32) by the second locking portion (25), and the counterpart terminal (4) includes a tubular box portion (41) into which the tab portion (18, 21) is inserted, and an opening (44) provided on a side wall of the box portion (41), the side wall being closer to the other end than to the one end, the opening (44) having a width through which the tab portion (18, 21) is configured to pass in the predetermined direction.

According to the connector having the configuration of [1], when an operator or the like pulls the terminal-attached electric wires in a direction away from the housing during disassembling work of an automobile or the like including the connector, an external force in the direction is applied to the housing via the counterpart terminals. At this time, since the holding force by the first locking portion on one end side of the tab continuous portion is larger than the holding force by the second locking portion on the other end side, the second locking portion having a relatively smaller holding force is easily separated from the housing before the first locking portion is. Further, the opening having a width through which the tab portion is configure to pass is provided on the side wall of the box portion of the counterpart terminal on the other end side. For this reason, the second locking portion of the tab portion is separated from the housing in a state in which the first locking portion of the tab portion is fixed to the housing, and the tab portion enters the opening of the counterpart terminal, whereby the entire housing is inclined. The tab portions are sequentially separated from the housing from the other end side toward the one end side of the tab continuous portion while the entire housing is inclined in this manner, and finally, all the tab portions are separated from the housing. By separating the plurality of tab portions sequentially, the terminal fitting and the housing can be separated with a smaller external force than that when the plurality of tab portions are separated from the housing at the same time. Accordingly, the terminal fitting and the housing can be separated before lances of the housing are broken as in a connector in the related art. As a result, the terminal fitting and the housing can be separated from each other simply by pulling the terminal-attached electric wires by an operator or the like as in the related art. Accordingly, the connector having the present configuration can be easily separated and disassembled.

[2] In the connector (1) according to [1], the first locking portion (24) has a shape of a projection that protrudes from the tab portion (18, 21) in a plate surface direction of the conductor plate and extends in a thickness direction of the conductor plate, the second locking portion (25) has a shape of a projection that protrudes from the tab portion (18, 21) in the plate surface direction of the conductor plate and extends in the thickness direction of the conductor plate, and the first locking portion (24) has a thickness in the thickness direction larger than a thickness of the second locking portion (25) in the thickness direction.

According to the connector having the configuration of [2], the first locking portion and the second locking portion each have a shape of a projection, and the thickness of the first locking portion in the thickness direction is larger than the thickness of the second locking portion in the thickness direction. Due to such a difference in the shape of the projection, a holding force of the first locking portion can be made larger than a holding force of the second locking portion.

[3] In the connector (1) according to [2], the number of the tab portions (18, 21) including the first locking portion (24) is larger than the number of the tab portions (18, 21) including the second locking portion (25).

According to the connector having the configuration of [3], the number of the tab portions including the first locking portion is larger than the number of the tab portions including the second locking portion. Due to such a difference in the number of the tab portions, a holding force at a holding portion by the first locking portion in the connector can be made larger than a holding force at a holding portion by the second locking portion.

[4] In the connector (1) according to [1], the terminal fitting (2) includes the tab portion (18, 21) including neither the first locking portion (24) nor the second locking portion (25).

According to the connector having the configuration of [4], the terminal fitting includes the tab portion including neither the first locking portion nor the second locking portion. This further facilitates the operation of separating the terminal fitting while inclining the housing as described above.

What is claimed is:

1. A connector comprising:

a terminal fitting including a terminal portion and a contact portion, the terminal portion extending from a tab continuous portion such that a plurality of tab portions are arranged side by side in a predetermined direction at intervals, the contact portion being connected to the tab continuous portion and to an external terminal, the terminal portion and the contact portion being implemented by one single conductor plate;

a housing having a plurality of accommodating chambers in which the plurality of tab portions are accommodated and in which the terminal fitting is accommodated; and a plurality of terminal-attached electric wires each including a counterpart terminal accommodated in the accommodating chambers and electrically connected to a corresponding one of the plurality of tab portions, and an electric wire to which the counterpart terminal is attached, wherein the terminal fitting includes a first locking portion provided on each of at least one of the tab portions located from one end of the tab continuous portion in the predetermined direction to an intermediate position of the tab continuous portion, and a second locking portion provided on each of at least one of the tab portions located from the intermediate position to another end of the tab continuous portion in the predetermined direction, a holding force for holding the tab portions in the accommodating chambers by the first locking portion is larger than a holding force for holding the tab portions in the accommodating chambers by the second locking portion, and the counterpart terminal includes a tubular box portion into which the tab portion is inserted, and an opening provided on a side wall of the box portion, the side wall being closer to the other end than to the one end, the opening having a width through which the tab portion is configured to pass in the predetermined direction.

2. The connector according to claim 1, wherein the first locking portion has a shape of a projection that protrudes from the tab portion in a plate surface direction of the conductor plate and extends in a thickness direction of the conductor plate, the second locking portion has a shape of a projection that protrudes from the tab portion in the plate surface direction of the conductor plate and extends in the thickness direction of the conductor plate, and the first locking portion has a thickness in the thickness direction larger than a thickness of the second locking portion in the thickness direction.

3. The connector according to claim 2, wherein the number of the tab portions including the first locking portion is larger than the number of the tab portions including the second locking portion.

4. The connector according to claim 1, wherein the terminal fitting includes the tab portion having neither the first locking portion nor the second locking portion.

* * * * *